United States Patent [19]

Sedillo et al.

[11] Patent Number: 4,615,393

[45] Date of Patent: Oct. 7, 1986

[54] HYDROCARBON SOLUBLE POLYMER COMPLEXES USEFUL AS VISCOSIFIERS IN FRACTURING OPERATIONS

[75] Inventors: Lawrence P. Sedillo, Houston; John C. Newlove, Kingwood, both of Tex.; Dennis G. Peiffer, East Brunswick; Robert D. Lundberg, Bridgewater, both of N.J.

[73] Assignee: Exxon Research and Engineering Co., Florham Park, N.J.

[21] Appl. No.: 673,004

[22] Filed: Nov. 19, 1984

[51] Int. Cl.[4] .................... E21B 43/26; E21B 43/267
[52] U.S. Cl. ................................. 166/308; 252/8.551
[58] Field of Search ............... 166/308, 282, 283, 271, 166/259; 252/8.55 R, 8.5 M

[56] References Cited

U.S. PATENT DOCUMENTS 3,046,222 7/1962 Phansalkar et al. ....... 252/8.55 R X
4,005,753 2/1977 Scheffel et al. ..................... 166/283
4,425,463 1/1984 Walker et al. ............. 252/8.5 M X Primary Examiner—Stephen J. Novosad
Assistant Examiner—Thomas J. Odar
Attorney, Agent, or Firm—Richard E. Nanfeldt

[57] ABSTRACT

A process for fracturing a subterranean formation surrounding a gas or oil well which comprises injecting into said subterranean formation under hydraulic pressure a fluid comprising about 0.01 to about 25 weight percent of a water insoluble polymer complex dissolved in a solvent system of a nonpolar organic liquid, said polymer complex comprising the interaction product of a metal neutralized sulfonated polymer and an amine containing polymer, wherein the sulfonate content of the sulfonated polymer is about 4 meq. per 100 gram of polymer to about 200 meq. per 100 gram of polymer and the basic nitrogen content of the amine containing polymer is about 4 meq. per 100 gram of polymer to about 500 meq. per 100 gram of polymer.

26 Claims, No Drawings

HYDROCARBON SOLUBLE POLYMER COMPLEXES USEFUL AS VISCOSIFIERS IN FRACTURING OPERATIONS

BACKGROUND OF THE INVENTION

1. Field of the Invention

The present invention relates to a process for the hydraulic fracturing of subterranean formations surrounding oil wells and gas wells by means of injection of a fracturing fluid into the well, wherein the fracturing fluid comprises a solution of a nonpolar organic liquid or oil, an interpolymer complex and optionally a polar cosolvent, propping agent, and soluble or insoluble additives.

2. Description of the Prior Art

Hydraulic fracturing has been widely used for stimulating the production of crude oil and natural gas from wells completed in low permeability reservoirs. The methods employed normally require the injection of a fracturing fluid containing a suspended propping agent into a well at a rate sufficient to open a fracture in the exposed formation. Continued pumping of fluid into the well at a high rate extends the fracture and leads to the buildup of a bed of propping agent particles between the fracture walls. These particles prevent complete closure of the fracture as the fluid subsequently leaks off into the adjacent formation and result in a permeable channel extending from the wellbore into the formation. The conductivity of this channel depends upon the fracture dimensions, the size of the propping agent particles, the particle spacing, and the confining pressures. Studies of conventional fracturing operations indicate that fracture widths seldom exceed about one-fourth inch and that conductivities in excess of about 250,000 millidarcy inches are rarely obtained. The average width and conductivity are considerably lower than these values.

With the advent of declining reserves, the drilling and stimulation of higher temperature wells in increasing the drilling and completion of tight dry gas and water sensitive formation is also on the rise. The industry is relying to a greater extent on hydrocarbon fluids to drill and complete these wells which cannot be treated with the normal water-based fluids, therefore, there has been shown a substantial need for hydrocarbon based viscosifiers which exhibit good performance at high temperature.

The incentives for developing fractures with conductivities sufficient to permit the application of fracturing to high permeability reservoirs are substantial. The low permeability formations in which conventional methods are used generally produce at low rates and hence total production remains low even though an improvement of several fold is obtained. In reservoirs of higher permeability, the initial production rates are normally much higher and hence a successful fracturing operation may produce a much greater improvement in terms of incremental barrels of oil per day. This is true even though the percentage improvement may be somewhat smaller than in a reservoir of lower permeability. Efforts to extend fracturing operations into undamaged reservoirs with permeabilities substantially in excess of about 15 to 20 millidarcies have in the past been largely unsuccessful.

A desirable formulation for hydraulic fracturing fluids for these difficult fracturing situations would be a fluid which possesses adequate viscosity to support the propping agent and to aid in propagating the fracture. Such a formulation would be an organic liquid containing at least one polymeric viscosifier.

Since the beginning of recorded oil well production, organic based viscosifiers have played an important role in hydraulic fracturing fluids. Some of these viscosifiers have been either metal soaps of fatty acids, or metal soaps of partially esterified phosphates. Both of these impart viscosity to hydrocarbons, but the metal soaps of fatty acids have inherent thermal thinning properties which give them limited utility at higher temperatures. The metal soaps of partially esterified phosphates have the disadvantages of being extremely pH sensitive along with being thermally thinning.

Therefore a viscosifier that has the advantage of maintaining viscosity at high temperatures and/or is not susceptible to variations in pH would represent an advancement of the prior art.

The instant invention differs from a number of applications, Ser. Nos. 223,482, now U.S. Pat. No. 4,361,658; 136,837, now U.S. Pat. No. 4,322,329; and 106,027, now U.S. Pat. No. 4,282,830, filed by Robert Lundberg et al, one of the instant inventors. These previously filed applications were directed to the gelling of the organic liquid by a water insoluble, neutralized sulfonated polymer whereas the instant invention is directed to fracturing fluids formed from nonpolar organic liquid and an interpolymer complex.

In a U.S. Ser. No. 547,955, filed Nov. 2, 1983, now abandoned, two polymers are mixed to produce an interpolymer complex which at relatively low concentration forms a three-dimensional network with a gel-like behavior.

In U.S. Ser. No. 547,955 the interpolymer complexes in hydrocarbon solutions are obtained by mixing two polymers which are strongly associating, with each other. One polymer will contan metal neutralized sulfonate groups along or pendant to its backbone, and the other polymer will contain basic amine groups. This interaction between metal neutralized and basic amine groups leads to a dynamic network formation, if each chain contains interacting groups in multiple locations.

In this application the use of this multi-polymer complex is described as a hydrocarbon viscosifier when sufficient hydrocarbon character is present in the polymers to allow solubility in hydrocarbon, particularly crude and semi-refined hydrocarbon solvents. The concentrations of multi-polymer complexes are described and can be varied to obtain a range of rheological properties. Furthermore, this invention discloses that by variations of sulfonation level on the sulfonated polymer, metal cation on the sulfonated polymer, level of amine in the amine containing polymer, and other parameters a range of rheological properties can be obtained and that finally, these multi-polymer complexes are useful in viscosifying hydrocarbon solutions for hydraulic fracturing.

SUMMARY OF THE INVENTION

The fracturing method of this invention is carried out by injecting fracturing fluid through a string of tubing of casing into a fracture. Injection of the high viscosity fluid is continued until a fracture of sufficient width to produce a highly conductive channel has been formed. The fracturing fluid enters into the fracture, whereupon efficient transmission of pressure pulses can occur easily within the fracture zone. The injected fluid is then permitted to leak off into the formation until the fracture has closed sufficiently to hold in place the proppant particles originally suspended in the fluid.

Accordingly, it is a primary object of the instant invention to describe an economical fracturing process for fracturing a subterranean formation by means of a fracturing fluid which comprises a nonpolar organic liquid, a water insoluble interpolymer complex, and optionally a polar cosolvent and/or a propping agent.

GENERAL DESCRIPTION

The present invention relates to a process for the fracturing of a subterranean formation surrounding an oil well or gas well in order to increase the recovery of the oil or gas. The process includes the steps of viscosifying an organic solvent system, preferably a hydrocarbon solvent, with a water insoluble interpolymer complex, and optionally suspending in the viscosified solvent system a proppant and other such soluble and/or insoluble materials as might be optionally desired for the efficient fracturing of the specific formation in question; delivering this complete fracturing fluid to the face of the subterranean formation; and injecting the fluid into the formation under sufficient hydraulic pressure to fracture the formation. The thickened polymer solution, having a viscosity greater than 50 centipoise acts to suspend the proppant and deliver it to the fracture and to efficiently propagate the fracture itself.

The thickened solution is formed by the dissolution of the water insoluble polymer complex in the solvent system. The concentration of the water insoluble polymer complex in the solution is 0.01 to 10 weight percent, more preferably about 0.1 to about 9, and most preferably about 0.2 to about 8. The viscosity obtained thereby is less than 10,000 cps, preferably less 1,000 cps as measured at 150° F.

The polymer complex of the instant invention is formed from the interaction of a metal neutralized sulfonated polymer and an amine containing polymer containing basic amine groups. These components are utilized in the proportion of about 0.05 to 20 parts of sulfonate containing polymer to about 1.0 parts of amine containing polymer by weight. Preferably, the polymers would be utilized in the proportion of from about 0.1 to 2 parts of sulfonate containing polymer to about 1.0 part of amine containing polymer.

The sulfonated polymer is characterized as having a polymer backbone which is substantially soluble in the organic liquid, and pendant sulfonate groups which are substantially insoluble in the organic liquid.

The number of sulfonate groups contained in the sulfonated polymer of the polymer complex is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. For vinyl homopolymers, such as polystyrene, the sulfonated analog having a sulfonate content of 1.0 mole percent means that one out of every 100 monomer repeat units in the polymer chain is sulfonated. In the case of copolymers, the same definition applied, except for the purposes of this calculation, the polymer can be considered to be prepared from a hypothetical monomer having an average molecular weight, which is the average of the two monomer components. Similarly for terpolymers, the same averaging concepts apply; however, three components are involved. For example, ethylene-propylene-ehtylidene norbornene (ENB) is a preferred polymer backbone for this invention. A representative terpolymer would have a composition (weight percent) or 50% ethylene, 45% propylene and 5% ENB. This composition has an average repeat unit molecular weight of about 38.9. Thus, sulfonation of this composition, occurs at the unsaturation of the ENB units to a level of 1.0 mole %, which means that in 38.9 gms (1 mole of average monomer repeat units) of this polymer, there would be present 0.01 mole of sulfonic acid groups. An alternate way of expressing this is to state the sulfonate level in terms of milliequivalents (meq.) of sulfonic acid groups per 100 gms of polymer. This latter procedure provides a rapid and independent measure of sulfonic acid content in a polymer through simple titration.

Both mole percent sulfonate and milliequivalent of sulfonate will be employed to describe the sulfonate polymers employed in this invention.

In general the sulfonated polymer will comprise from about 4 meq. up to 200 meq. of sulfonate groups, per 100 g. of polymer, more preferably about 10 meq. to about 100 meq. The sulfonated polymers in the instant invention are neutralized with basic materials selected from the groups consisting of Groups IA, IIA, IVA, VIA, VIIA, VIIIA, IB and IIB of the Periodic Table of the Elements and lead, tin, aluminum and antimony. A preferred counter ion for this invention is zinc, as explained below. Sulfonated polymers which are the subject of the process of the instant invention are illimitable and include both plastic and elastomeric polymers. Specific polymers include sulfonated polystyrene, sulfonated t-butylstyrene, sulfonated polyethylene, sulfonated polypropyene, sulfonated styrene-acrylonitrile copolymers, sulfonated stryene-methylstyrene copolymers, sulfonated styrene-t-butylstyrene copolymers, sulfonated block copolymers of styrene-ethylene oxide, sulfonated polyisobutylene, sulfonated ethylene-propylene terpolymers, sulfonated polyisoprene, and sulfonated elastomers and their copolymers such as isoprene-styrene sulfonate copolymer and copolymers of sulfonated styrene with one or more acrylate monomers such as alkyl methacrylate, alkylacrylate, N-alkylacrylamide and/or N-alkyl methacrylamide.

Neutralization of the cited sulfonated polymers with appropriate metal hydroxides, metal acetates, metal oxides, etc. can be conducted by means well-known in the art. For example, the sulfonation process with BUTYL rubber containing a small 0.3 to 1.0 mole % unsaturation, can be conducted in a suitable solvent such as toluene with acetyl sulfate as the sulfonating agent. The resulting sulfonic acid derivative can then be neutralized with a number of different neutralization agents such as sodium phenolate and similar metal salts. The amounts of such neutralization agents employed will normally be stoichiometrically equal or in some excess to the amount of free acid in the polymer plus any unreacted reagent which still is present. It is preferred that the amount of neutralizing agent be equal to the molar amount of sulfonating agent originally employed, plus 10% more to ensure full neutralization. The use of more of such neutralization agent is not critical. Sufficient neutralization agent is necessary to effect at least 50% neutralization of the sulfonic acid groups present in the polymer, preferentially at least 90%, and most preferably essentially complete neutralization of such acid groups should be effected.

The degree of neutralization of said ionomeric groups may vary from 50 to 500 mole %, preferably 90 to 200%. It is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group I and Group IIA, which include Li, Na, K, etc., Be, Mg., Ca, etc. We have found that these species do not intereact as strongly with amine groups as the more preferred species described below. Those metals are commonly defined as members of the transition elements (see chemical text: CHEMICAL PRINCIPLES AND PROPERTIES, by M. J. Sienko and R. A. Plane, McGraw Hill Book Co., 1974, page 19). These metal cations are best exemplified by zinc and intereact strongly with pyridine and similar amines. As a consequence, a zinc neutralized sulfonated polymer interacts much more strongly with an amine containing copolymer than does a magnesium or sodium neutralized system. It is for this reason that the transition elements are preferred with zinc, copper, iron, nickel and cobalt being especially preferred. We also include antimony, titanium, zirconium, chromium, aluminum and lead as suitable cations.

A third species which could be employed is the free acid of the sulfonated polymer, which will also intereact with amine-containing polymers. In this latter case, it is clear that the interaction is a classic acidbase interaction, while with the transition metals, a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry, (based on small molecule analogs).

The sulfonated polymers of the instant invention may vary in number average molecular weight from 1,000 to 10,000,000, preferably 5,000 to 5,000,000, most preferably from 10,000 to 2,000,000. These polymers may be prepared by methods known in the art; for example, see U.S. Pat. No. 3,836,511, hereby incorporated by reference.

It is evident that the sulfonated polymers covered within this invention encompass a broad class of hydrocarbon polymer systems. It is important that these hydrocarbon polymer backbones (in the absence of the sulfonate groups) be soluble in the organic liquid. To achieve the desired solubility, it is required that the polymer to be employed possess a degree of polarity consistent with that solvent. This solubility relationship can be readily established by anyone skilled in the art simply by reference to appropriate texts (e.g., POLYMER HANDBOOK, edited by Brandrup and Immergut, Interscience Publishers, 1967, Section IV-341). In the absence of appropriate polymer-solvent compatibility knowledge, this can be determined experimentally by observing whether the selected polymer will be soluble in the solvent at a level of 1 gm polymer per 100 ml solvent. If the polymer is soluble, then this demonstrates that it is an appropriate backbone for modification with sulfonate groups to achieve the objectives of this invention. It is also apparent that polymers that are too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially noncrystalline.

Specific examples of ionomeric polymers which are useful in the instant invention because of their solubility characteristics include but are not limited to sulfonated EPDM terpolymers, sulfonated polystyrene, sulfonated poly(t-butylstyrene), (substantially noncrystalline) polyethylene and ethylene copolymers, (substantially non-crystalline) polypropylene and propylene copolymers, sulfonated polyisobutylene, sulfonated ethylene-propylene terpolymers, sulfonated polyisoprene, sulfonated polyvinyltoluene, sulfonated vinyltoluene copolymers, sulfonated isoprene-styrene copolymers, and copolymers of sulfonated styrene and one or more acrylic monomers such as lauryl acrylate, stearyl acrylate, lauryl methacrylate, and stearyl methacrylate. Of course, many other water insoluble ionomeric polymers would usefully serve as constituent parts of the water insoluble interpolymer complex, and the above listing of specific examples should not be construed to limit the scope of this invention in any way.

Preferred among these sulfonated polymers are the water insoluble sulfonated EPDM polymers which are prepared by sulfonation of EPDM containing ethylidene norbornene monomer units.

The water insoluble sulfonated polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well-known to those skilled in the art; i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

The amine-containing polymer of the polymer complex is typically a polymeric backbone where the nitrogen elements are in the chain or pendant to it. Such a polymer may be obtained by direct copolymerization of a monomer containing the basic moiety with other monomers, or by grafting a monomer containing the basic moiety on to a polymerized chain. Monomers can be chosen from vinyl monomers leading to hydrocarbon soluble polymers such as styrene, t-butylstyrene, acrylonitrile, isoprene, butadiene, alkyl acrylates having about 6 to 25 carbon atoms, alkyl methacrylates having about 7 to 26 carbon atoms, N-alkyl acrylamides, N-alkyl methacrylamides and vinyl acetate. Monomers containing a basic moiety will be those which contain amine or alkyl amine groups or pyridine groups, such as vinylpyridine.

A preferred basic polymer for this invention is a polymer which is soluble in crude and distilled hydrocarbon solvents such as paraffinic, naphthenic, and aromatic solvents. More specifically preferred is a polymer in which the basic nitrogen functionality is supplied by a vinylpyridine monomer such as 2- or 4-vinylpyridine or mixtures of the two; wherein 4-vinylpyridine is preferred. Specific preferred polymers are copolymers of vinylpyridine with one or more of the following acrylic monomers: lauryl methacrylate, lauryl acrylate, stearyl methacrylate, and stearyl acrylate because of the high solubility in crude and semi-refined hydrocarbon solvents inherent in these polymers.

The amine content in the basic polymer can vary widely and can be expressed in terms of basic nitrogen. In this respect the nitrogen content in amides and similar non-basic nitrogen functionality is not part of the interacting species. A minimum of three basic groups must be present on the average per polymer molecule and the basic nitrogen content generally will range from 4 meq per 100 grams of polymer up to 500 meq per 100 grams. A range of 8 to 100 meq per 100 grams is preferred.

The amount of vinylpyridine in the preferred amine-containing polymer can likewise be expressed in mole percent. Thus, the vinylpyridine content should range from about 0.05 mole % to about 50 mole % of the basic polymer, more preferably from about 0.05 to about 20 mole % and most preferably from about 1.0 to about 20 mole %.

The number average molecular weight of the preferred amine-containing polymer is about 10,000 to about 10,000,000, more preferably about 20,000 to about 5,000,000, and most preferably about 30,000 to about 2,000,000.

The organic solvent system viscosified within the process of the instant invention comprises an organic liquid and optionally a polar cosolvent. The organic liquid of the solvent system has a solubility parameter of less than 8.5 and is selected from a group which consists of, but is in no way limited to, crude and distilled paraffinic solvents, napthenic solvents, aromatic solvents and mixtures thereof. Specific examples of these types of solvents include hexanes, heptanes, octanes, cyclohexane, benzene, toluene, xylene, and mixtures thereof. Preferred for their higher flash points, low cost, availability, and utility in the subject invention as the organic liquid of the solvent system are mineral oils, diesel oils, crude petroleum oils, kerosenes, heavy aromatic naphthas and other hydrocarbon blends well known in commerce.

The polar cosolvent of the organic solvent system has a solubility parameter of at least 9.5, more preferably at least 10.5.

There is the additional and important constraint that the polar cosolvent be more polar than the organic liquid. This is required in order that the proper interaction between polar cosolvent and ionic groups be obtained. If we designate the solubility parameter of the organic liquid as $S_L$, and the solubility parameter of the polar cosolvent as $S_P$, then we require that:

$$S_P \geq S_L + 1.0$$

In other words, the polar cosolvent will be substantially more polar than the organic liquid to be thickened.

Normally the polar cosolvent will be a liquid at room temperature; however, this is not a requirement. It is required that the polar cosolvent be soluble or miscible with the organic liquid at the levels employed in this invention. Under normal circumstances, this miscibility requirement precludes the use of water as a polar cosolvent.

Among the chemical substances meeting the criteria for use as the polar cosolvent are aliphatic and aromatic alcohols, aliphatic and aromatic amines, nitrogen containing heterocyclic compounds, aliphatic and aromatic thiols, poly(alkyleneglycols), alkoxylates of alcohols and amines and many other materials and mixtures thereof. Preferred for their low cost safety availability, and utility as polar cosolvents are $C_1$–$C_{10}$ alcohols.

Within the method of the instant invention the polar cosolvent can be optionally incorporated into the solvent system to weaken or totally disrupt the ionic linkages which weld the water insoluble interpolymer complex together and contribute significantly to the viscosifying power of the complex. For example, the polar cosolvent can be added to the mixture of organic liquid and polymer complex to solubilize the pendant sulfonate groups and/or to moderate the viscosity of the solvent system. The polar cosolvent may comprise at most 40, preferably at most 20 weight % of the total mixture of organic liquid, polymer complex, and polar cosolvent. In order to provide the solubilizing and/or viscosity modifying effect when desired, the polar cosolvent must be present in amounts of from 10 to 600 moles per mole of ionic group and preferably from 20 to 400 moles per mole of ionic group.

By propping agent or proppant is meant a solid material comprising high strength, high integrity particles capable of holding open the formation fracture following the reduction of the hydraulic fracturing pressure. Most commonly used as proppant are carefully graded sand and sintered bauxite particles.

Other optional additives may be soluble or insoluble solids or liquids incorporated in the fracturing fluid to provide desirable or necessary properties to the fluid.

Examples of other optional additives are represented by but not limited to the following: non-emulsifying agents, filtration control agent, friction reducers and selecting wetting agents.

Practitioners of the art described herein will observe that the rheological properties of the viscosified fracturing fluid will be influenced to a large degree by several chemical and physical characteristics of the polymer and solvent components of the fluid. These characteristics thus provide parameters for adjustment of the rheological properties of the fracturing fluid to those desired. The molecular weights of the polymers of the complex, the number of sulfonate groups in the sulfonate polymer and basic groups in the amine containing polymer, branching of the polymers, cross-linking of the polymers, counter ion(s) in the sulfonate polymer, rigidity of the polymer chains, polarity of the solvents in the solvent system, proportion of organic liquid to polar cosolvent in the solvent system and concentration of the polymer complex are some of the many factors which affect the resultant rheology of the fracturing fluid. It is a valuable, surprising, and novel aspect of this invention, however, that the rheological properties of the fluids viscosified in this way are substantially less affected by temperature, pH and contaminant substances in the fracturing fluid than are organic fracturing fluids viscosified by methods known in the prior art.

In order to viscosify the solvent system with interpolymer complex the several solvent and polymer components may be mixed according to a wide variety of schemes depending upon the mixing and pumping equipment available to perform the fracturing job and the rheological properties desired in the fracturing fluid. For example, the polymers of the interpolymer complex may be dissolved together in the solvent system to form a thickened fluid which is pumped downhole. Alternatively, the sulfonate and amine containing polymers may be separately dissolved in individual portions of the solvent system using polar cosolvent as necessary to suppress the viscosity produced by the sulfonate polymer. These solutions being relatively non-viscous can be conveniently packaged, shipped, and/or pumped and can be combined with each other and optionally more solvent to produce the viscosified fracturing fluid. Another option is to form a concentrated solution of the interpolymer complex, reducing the viscosity of the fluid by the inclusion of a water soluble polar cosolvent in the system. Upon being mixed with water in the tubular goods leading downhole the fluid would gel as the polar cosolvent is extracted out of it by the water. Other embodiments of this invention dealing with the preparation and application of the fracturing fluid are too numerous to describe herein but will be discernible by practitioners of the fracturing art made familiar with this description of the subject invention.

In the case where the sulfonate containing polymer and amine containing polymer are dissolved in separate portions of the solvent system, the concentration of the sulfonated polymer in one solution is about 0.05 to 30 weight percent, preferably about 0.1 to 10 weight percent. The concentration of the amine contianing polymer in the other solution is about 0.05 to 50 weight percent, preferably about 0.1 to 5, more preferably about 0.5 to 5. The two solutions of the polymers are mixed together to form the polymer complex in such proportion as is consistent with the desired ratios described above.

DESCRIPTION OF THE PREFERRED EMBODIMENTS

The following are preferred embodiments of the instant invention.

EXAMPLE 1

Preparation of lauryl methacrylate-Vinyl Pyridine Copolymer

A copolymer of lauryl methacrylate and vinyl pyridine was prepared via a free radical emulsion copolymerization process. The preparation was conducted as follows:

In a suitable, stirred reaction vessel under a nitrogen blanket the following ingredients were charged:
200 g. Lauryl methacrylate
200 g. Distilled $H_2O$
4 g. Sodium lauryl sulfate
1 g. Azobisisobutyronitrile
4.7 g. 4-vinylpyridine The polymerization was conducted at approximately 70° C. for 4–24 hours and the resultant emulsion was fluid and uniform. Three ml. of methanol containing 0.1% of hydroquinone was added as an inhibitor and the reaction mixture was partioned in an excess of xylenes. The xylene fraction was water washed and then dried in a vacuum over at 80° C. to constant weight.

The resulting product represented 80% conversion of the reactive monomers.

EXAMPLE 2

Preparation of Sulfonated EPDM

The preparation of sulfonated EPDM has been well-described in the patent and published literature (for example, see U.S. Pat. No. 4,184,988 or ACS Monograph edited by A. Eisenberg, 1980, p. 4). A zinc sulfonated EPDM was prepared via those procedures containing 10 meq. of zinc sulfonate, designated MS-14. The resulting polymer was available as a free-flowing crumb and employed in that form as a blending component in the following examples.

EXAMPLE 3

The following solutions of polymers in xylene were prepared:

Solution A 0.5 weight % of MS-14, a zinc sulfo-EPDM was dissolved in xylene MS-14 is a zinc salt of sulfonated EPDM terpolymer. The sulfonation level was 10 milliequivalents per 100 g backbone. The backbone was a 90,000 weight average molecular weight EPDM with a content of 55 weight % ethylene, 45 weight % propylene, and 5 weight % ethylidenenorbornene (ENB).

Solution B 0.5 weight % of tertiary-butylstyrene-vinylpyridine copolymer (TSB-VPyr) designated 10563-78 was dissolved in xylene. The TBS-VPyr copolymer contained about 10 mole % VPyr and had an intrinsic viscosity in xylene at 25° C. of 4.3 (on the order of $1 \times 10^6 \overline{M}n$).

Both solutions were readily prepared by mild stirring using a magnetic stirrer.

Solutions A and B were further combined to yield instantaneously interpolymer complexes in solutions at a total polymer concentration of 0.5 weight %. This was done at various ratios, and the viscosity-shear rate relation of these solutions was measured by a Haake Rotovisco CV-100 viscometer at 25° C. The low shear viscosity of these solutions at 0.6 $sec^{-1}$ was:

| Solution | Parts A/Parts B | Moles $SO_3^-/N$ | Viscosity, cP |
|---|---|---|---|
| B | 0/100 | 0 | 3.6 |
| C | 25/75 | 0.03 | 4.9 |
| D | 50/50 | 0.10 | 15.0 |
| E | 65/35 | 0.18 | 33.0 |
| F | 75/25 | 0.30 | 1420 |
| G | 85/15 | 0.57 | 3750 |
| H | 90/10 | 0.90 | 317 |
| I | 95/5 | 1.90 | 7.5 |
| A | 100/0 | — | 2.5 |

The dramatic increase in viscosity for the mixed solutions over the individual ones (A and B) suggests a creation of a dynamic polymeric network in the xylene solution.

TESTING PROCEDURES

Presented in Tables 1-10 are representative data on the rheological properties of hydrocarbon soluble interpolymer complexes composed of the zinc salt of EPDM (25 milliequivalent zinc ion) and a copolymer of lauryl methacrylate (LMMA) and 4-vinyl pyridine (composed of approximately 94 mole % LMMA and 6 mole % 4-vinylpyridine). The polymers were dissolved separately in Diesel #2 as stock solutions on a weight percentage basis. Portions of the two stock solutions were combined with vigorous stirring and the properties were measured.

Subsequently, the samples were heated under constant shear on a FANN 50C rheometer alternately at 170 sec$^{-1}$ and 85 sec$^{-1}$ for rheological property measurement. The testing was completed by cooling the sample and measuring a final rheology. The viscosities obtained show that these hydrocarbon soluble interpolymer complexes are very effective at enhancing rheological properties of hydrocarbons with improved viscosity stability.

The rheological properties as shown in Tables 1-10 are representative of the data that can be found in hydraulic fracturing fluids.

TABLE 1

1:1 Mixture of 2% active ingredient comprised of 1% W/V Zn—sulfo EPDM and 1% W/V lauryl-methacrylate-vinyl pyridine dissolved in Diesel #2

| Time (Min) | Temp (°F.) | Viscosity @ 170 sec$^{-1}$ |
|---|---|---|
| 0 | 70 | 612. |
| 18 | 120 | 525. |
| 31 | 150 | 336. |
| 48 | 150 | 211. |
| 75 | 150 | 187. |
| 125 | 75 | 547. |

TABLE 2

1:1 Mixture of 1% active ingredient comprised of 0.5% W/V Zn—sulfo EPDM and 0.5 % W/V lauryl-methacrylate-vinyl pyridine dissolved in Diesel #2

| Time (Min) | Temp (F.) | Viscosity @ 170 sec$^1$ |
|---|---|---|
| 0 | 70 | 153. |
| 18 | 150 | 119. |
| 33 | 150 | 110. |
| 49 | 150 | 106. |
| 62 | 150 | 105. |
| 80 | 250 | 96. |
| 90 | 300 | 83. |
| 125 | 300 | 80. |
| 137 | 175 | 85. |
| 151 | 100 | 97. |
| 190 | 80 | 110. |
| 226 | 70 | 120. |

TABLE 3

1:3 Mixture of 1% active ingredient comprised of 0.25% W/V Zn—Sulfo EPDM and 0.75% W/V lauryl-methacrylate-vinylpyridine dissolved in Diesel #2

| Time (Min) | Temp (F.) | Viscosity @ 170 sec$^{-1}$ |
|---|---|---|
| 0 | 80 | 998. |
| 14 | 100 | 1051. |
| 21 | 150 | 1076. |
| 34 | 150 | 1112. |
| 62 | 150 | 1157. |
| 86 | 150 | 1182. |
| 110 | 230 | 943. |
| 133 | 75 | 935. |

TABLE 4

3:1 Mixture of 1% active ingredient comprised of 0.75% W/V Zn—sulfo EPDM and 0.25 % W/V lauryl-methacrylate-vinyl pyridine dissolved in Diesel #2

| Time (Min) | Temp (F.) | Viscosity @ 170 sec$^{-1}$ |
|---|---|---|
| 0 | 80 | 190. |
| 14 | 150 | 79. |
| 34 | 150 | 75. |
| 67 | 150 | 73. |
| 97 | 300 | 59. |
| 133 | 300 | 51. |
| 211 | 80 | 78. |
| 231 | 80 | 80. |

TABLE 5

1:1 Mixture of 1% active ingredient comprised of 0.5% W/V Zn—sulfo EPDM and 0.5% W/V lauryl-methacrylate-vinyl pyridine dissolved in Diesel #2

| Time (Min) | Temp (F.) | Viscosity @ 170 sec$^{-1}$ |
|---|---|---|
| 0 | 75 | 264. |
| 39 | 150 | 195. |
| 62 | 150 | 193. |
| 87 | 300 | 126. |
| 100 | 300 | 119. |
| 150 | 300 | 98. |
| 200 | 300 | 92. |
| 243 | 80 | 240. |
| 393 | 80 | 240. |

TABLE 6

1:3 Mixture of 0.5% active ingredient comprised of 0.125% W/V Zn—sulfo EPDM and 0.375% W/V lauryl-methacrylate-vinyl pyridine dissolved in Diesel #2

| Time (Min) | Temp (F.) | Viscosity @ 170 sec.$^{-1}$ |
|---|---|---|
| 0 | 80 | 195. |
| 20 | 125 | 183. |
| 31 | 150 | 181. |
| 40 | 150 | 175. |
| 45 | 150 | 173. |
| 66 | 225 | 144. |
| 82 | 80 | 183. |

TABLE 7

1:1 Mixture of 0.5% active ingredient comprised of 0.25% W/V Zn—sulfo EPDM and 0.25% W/V lauryl-methacrylate-vinyl pyridine dissolved in Diesel #2

| Time (Min) | Temp (F.) | Viscosity @ 170 sec.$^{-1}$ |
|---|---|---|
| 0 | 80 | 36. |
| 21 | 130 | 27. |
| 41 | 150 | 22. |
| 54 | 200 | 19. |
| 75 | 80 | 26. |
| 0 | 80 | 26. |
| 30 | 150 | 22. |
| 246 | 150 | 26. |
| 275 | 80 | 46. |

TABLE 8

1:3 Mixture of 1% active ingredient comprised of 0.25% W/V Zn—sulfo EPDM and 0.75% W/V lauryl-methacrylate-vinyl pyridine dissolved in West Texas Crude Oil

| Time (Hrs) | Time (Min) | Temp (F.) | Viscosity @ 170 sec.$^{-1}$ |
|---|---|---|---|
| 0 | 0 | 80 | 205. |
| 0.46 | 28 | 150 | 132. |
| 0.88 | 53 | 150 | 101. |
| 1.05 | 63 | 150 | 97. |
| 18.05 | 1083 | 150 | 71. |
| 18.72 | 1123 | 70 | 81. |

TABLE 9

1:4 Mixture of 1% active ingredient comprised of 0.2% W/V. Zn—sulfo EPDM and 0.8% W/V lauryl-methacrylate-vinyl pyridine dissolved in West Texas Crude Oil

| Time (Min) | Temp (F.) | Viscosity @ 170 sec.$^{-1}$ |
|---|---|---|
| 0 | 80 | 279. |
| 15 | 100 | 190. |
| 30 | 150 | 138. |
| 100 | 150 | 122. |
| 130 | 300 | 66. |
| 165 | 300 | 51. |
| 245 | 80 | 159. |

TABLE 10

3:1 Mixture of 1% active ingredient comprised of 0.75% W/V Zn—sulfo EPDM and 0.25% W/V Lauryl-methacrylate-vinyl pyridine dissolved in West Texas Crude Oil

| Time (Min) | Temp (F.) | Viscosity @ 170 sec$^{-1}$ |
|---|---|---|
| 0 | 80 | 190. |
| 19 | 150 | 159. |
| 35 | 150 | 150. |
| 60 | 150 | 146. |
| 93 | 300 | 118. |
| 136 | 300 | 105. |
| 165 | 80 | 150. |
| 217 | 80 | 156. |

What is claimed is:

1. A process for fracturing a subterranean formation surrounding a gas or oil well which comprises injecting into said subterranean formation under hydraulic pressure a fluid comprising about 0.01 to about 25 weight percent of a water insoluble polymer complex dissolved in a solvent system comprising a nonpolar organic liquid, said polymer complex comprising the interaction product of a metal neutralized sulfonated polymer and an amine containing polymer, wherein the sulfonate content of the sulfonated polymer is about 4 meq. per 100 grams of polymer to about 100 meq. per 100 gram of polymer and the basic nitrogen content of the amine containing polymer is about 4 meq. per 100 gram of polymer to about 500 meq. per 100 gram of polymer, wherein said organic liquid is selected from the group consisting of paraffinic hydrocarbons, naphthenic hydrocarbons, aromatic hydrocarbons, ketones, chlorinated aliphatic hydrocarbons, cyclic aliphatic ethers, aliphatic ethers and organic aliphatic esters and mixtures thereof, wherein the amine containing polymer is a copolymer of vinylpyridine with other vinyl monomers which are selected from the group consisting of acrylates, methacrylates, alkyl acrylates, alkyl methacrylates, N-alkylacrylamide and N-alkylmethacrylamides and mixtures thereof, said acrylates or methacrylates, etc. having from about 6 to about 26 carbon atoms.

2. The process of claim 1, wherein the sulfonate groups are neutralized with basic compounds selected from Groups IIA, IVA, VIA, VIIA, VIIIA, IB, and IIB of the Periodic Table of Elements, and basic lead, aluminum, tin and antimony compounds.

3. The process of claim 2, wherein the neutralized sulfonated polymer contains zinc as the counterions.

4. The process of claim 2, wherein said sulfonated polymer is derived from an EPDM terpolymer.

5. The process of claim 1, wherein the amine containing polymer is a copolymer of vinyl pyridine and an alkyl acrylate having about 6 to about 25 carbon atoms.

6. The process of claim 1, wherein the amine containing polymer is a copolymer of vinyl pyridine and an alkyl methacrylate having about 7 to about 26 carbon atoms.

7. The process of claim 5, wherein said alkyl acrylate is substantially lauryl acrylate.

8. The process of claim 6, wherein said alkyl methacrylate is substantially lauryl methacrylate.

9. The process of claim 1, wherein the amine containing polymer is a copolymer of stearyl acrylate and vinyl pyridine.

10. The process of claim 1, wherein the amine containing polymer is a copolymer of stearyl methacrylate and vinyl pyridine.

11. The process of claim 1, wherein said sulfonated polymer is in excess of said amine-containing polymer.

12. The process of claim 1, wherein said amine-containing polymer is in excess of said sulfonated polymer.

13. The process of claim 1, wherein said sulfonated polymer is selected from the group consisting of sulfonated ethylene, sulfonated propylene, sulfonated ethylene-propylene copolymers and terpolymers, wherein the third monomer is a nonconjugated diene hydrocarbon having from 5 to 15 carbon atoms and sulfonated polystyrene.

14. The process of claim 1, wherein said solvent system further includes a polar cosolvent.

15. The process of claim 14, wherein said polar cosolvent is selected from the group consisting of alcohols and amines.

16. The process of claim 14, wherein said polar cosolvent has a boiling point of at least 50° C.

17. The process of claim 14 wherein said polar cosolvent is selected from the group consisting of aliphatic alcohols, hydroxy ethers, aliphatic amines, thiols, di-or trifunctional aliphatic alcohols, water miscible amides, acetamides, phosphates, and lactones and mixtures thereof.

18. The process of claim 14 wherein said polar cosolvent is selected from the group consisting of methanol, ethanol, propanol, and isopropanol and mixtures thereof.

19. The process of claim 14 wherein said polar cosolvent has a solubility parameter of at least about 9.5 and is water miscible.

20. The process of claim 1 wherein said organic liquid is selected from the group consisting of crude and distilled paraffinic, napthenic, and aromatic hydrocarbons.

21. The process of claim 1 further including a propping agent.

22. The process of claim 1 wherein said organic liquid is a diesel oil.

23. The process of claim 1 wherein said organic liquid is a crude petroleum oil.

24. The process of claim 1 wherein said organic liquid is a mineral oil.

25. The process of claim 1 wherein said organic liquid is a kerosene oil.

26. The process of claim 1 wherein said organic liquid is selected from the group consisting of benzene, toluene, ethylbenzene, xylene, and mixtures thereof.

* * * * *